April 16, 1957     O. E. CARLSON     2,789,244
POSITIVE FEED CONSUMABLE ELECTRODE DEVICE
Filed Jan. 26, 1955
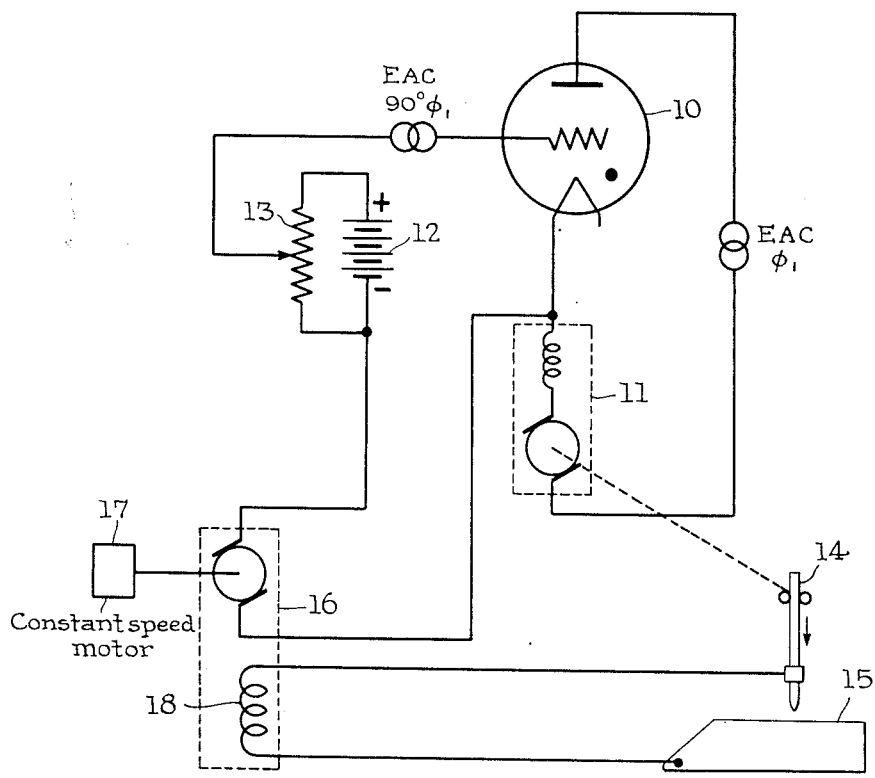
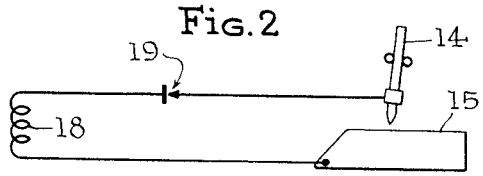
INVENTOR
Oscar E. Carlson
BY    Kemon and Palmer
ATTORNEY

United States Patent Office 2,789,244
Patented Apr. 16, 1957

2,789,244
POSITIVE FEED CONSUMABLE ELECTRODE DEVICE

Oscar E. Carlson, Paterson, N. J.

Application January 26, 1955, Serial No. 484,185

5 Claims. (Cl. 314—72)

This invention relates to electronic motor control devices, and more particularly to a control circuit for use in conjunction with a motor utilized to feed a welding rod toward a workpiece.

In many welding operations it is desirable to maintain a constant arc voltage, and numerous schemes have been devised for this purpose heretofore. Most of the prior suggestions are limited under practical working conditions for one reason or another. Some are too complex and, therefore, too costly to manufacture to be commercially feasible. In others, the range of control is so small that application is seriously limited.

Accordingly, it is an object of this invention to provide a simplified circuit for controlling the feed of a weld rod to a workpiece.

It is a further object to provide a control of this type in which the speed of the motor can be varied over wide limits.

A further object is to make use of a rotating magnetic amplifier to feed an error signal or voltage to the control circuit.

Other objects will be apparent from the following description, read in conjunction with the attached sheet of drawing, in which:

Fig. 1 shows schematically a preferred embodiment of the control system of this invention, and Fig. 2 shows a modification of a portion of Fig. 1 necessary to utilize the invention in conjunction with alternating current arcs.

In general, use is made of a conventional basic thyratron circuit for controlling a direct current motor from an alternating current source. The instant invention lies in the use of a special feedback loop arrangement for effecting the desired motor control.

Referring now to Fig. 1 of the attached drawing, the thyratron 10 is connected in series with an A. C. source and a D. C. motor 11. While the motor is shown as a series motor, it could also be a compound or shunt-wound motor. The conventional phase shifted voltage (substantially 90° out of phase with the anode voltage) is applied to the grid of the thyratron and a variable D. C. reference voltage is also included in the grid to cathode circuit. Such reference voltage is symbolized on the drawing by a battery 12 and potentiometer 13. The motor 11 is mechanically connected to drive a mechanism for feeding the weld rod 14 toward a workpiece 15, as indicated schematically on the drawing.

In order to maintain the arc voltage between the weld rod and the workpiece constant, it is necessary to incorporate in the grid to cathode circuit of the thyratron a voltage which is proportional to the arc voltage. According to the present invention this voltage is introduced as follows:

A small D. C. generator 16 is so connected that its output voltage is a part of a series circuit between the cathode and the grid of the thyratron 10. This same circuit, of course, includes the previously mentioned D. C. reference voltage and phase shifted A. C. voltage. The voltage which appears between the grid and cathode at any time is, therefore, a resultant of these three voltages. The D. C. generator must be driven at constant speed and this could be effected by use of a synchronous motor 17, or equivalent device, directly coupled to the generator shaft. In order to make the output of the generator proportional to the arc voltage, the field winding 18 of the generator is simply connected electrically between the weld rod 14 and the workpiece 15. The D. C. generator is thus excited by the arc voltage which is relatively small. The generator output voltage, however, is relatively high, and the generator therefore acts as an amplifier with high voltage gain.

The above completes a description of a preferred embodiment of the basic circuit. The operation is as follows:

If we assume that an arc has been struck between the rod and the workpiece, then any deviation in the length of the gap will result in a change of arc voltage. Such changes appear in amplified form in the voltage output of the D. C. generator, because its field winding is excited by the arc voltage, and the resultant voltage between the grid and cathode of the thyratron is thus changed proportionately. This in turn controls the percentage of time during the applied alternating current cycle during which the thyratron is conductive. The thyratron, therefore, is effective to control the voltage applied to the drive motor in such a way as to automatically compensate for changes in arc voltage by either advancing or retarding the rate of feed of the weld rod toward the workpiece.

In Fig. 2, the circuit which includes the generator field, the weld rod and the workpiece, is shown as including a rectifier 19 which would be necessary when the arc is excited by an alternating current source.

From the foregoing, it will be apparent to those skilled in this art that there is herein shown and described a new and useful control circuit arrangement. While this invention has been described with particular reference to the control of the feed of a weld rod toward a workpiece, it will be further apparent that this invention has application wherever consumable electrodes are used, and where a constant arc voltage is desirable. Examples of other uses include electric furnaces, arc lights and the like. Polyphase installations are equally susceptible to electrode feed control by the apparatus of the instant invention.

Variations of the specific circuitry shown are contemplated within the scope of the appended claims.

I claim:

1. A system for controlling the feed of an electrode to maintain a constant arc voltage between the electrode and a work surface, comprising in combination: a D. C. motor; means including said motor for feeding an electrode toward a work surface; grid controlled gaseous rectifier means connected to apply a D. C. voltage to said motor from an A. C. source; a D. C. generator; means for driving said generator at constant speed; means for applying to the field winding of said generator, a voltage proportional to the voltage of the arc to be controlled; means providing a D. C. reference voltage; means providing an A. C. voltage substantially 90° out of phase with the A. C. source; and means for connecting between the grid and cathode of said gaseous rectifier a voltage which is the resultant of a series connection of the D. C. reference voltage, the phase shifted A. C. voltage and the generator output voltage.

2. A system as defined by claim 1 in which the arc voltage is applied directly to the field winding of the D. C. generator.

3. A system as defined by claim 1 in which the D. C.

reference voltage is adjustable to vary the basic arc voltage to be maintained constant.

4. A system for controlling the feed of an electrode to maintain a constant arc voltage between the electrode and the work surface, comprising in combination: a series wound D. C. motor; means including said motor for feeding an electrode toward a work surface; a thyratron connected to apply a D. C. voltage to said motor from an A. C. source; a D. C. generator; means for driving said generator at constant speed; means for applying the arc voltage to be controlled to the field winding of said D. C. generator; means providing a variable D. C. reference voltage; means providing an A. C. voltage substantially 90° out of phase with the A. C. source; and means connecting between the grid and cathode of said thyratron a voltage which is the resultant of a series connection of said D. C. reference voltage, the phase shifted A. C. voltage and the generator output voltage.

5. A system as defined by claim 1 in which the arc to be controlled is excited by an alternating current source, and in which the arc voltage is applied to the field winding of the generator through rectifying means.

References Cited in the file of this patent

UNITED STATES PATENTS

| | | |
|---|---|---|
| 1,298,715 | Hollis | Apr. 1, 1919 |
| 2,234,239 | Fruedenhammer | Mar. 11, 1941 |
| 2,282,522 | Kratz | May 12, 1942 |
| 2,636,102 | Lobosco | Apr. 21, 1953 |